US008489066B2

(12) United States Patent
Imming et al.

(10) Patent No.: US 8,489,066 B2
(45) Date of Patent: *Jul. 16, 2013

(54) SYSTEMS AND METHODS FOR IDENTIFYING CALLER LOCATIONS

(75) Inventors: Philip C. Imming, Coronado, CA (US); John H. Chin, San Diego, CA (US)

(73) Assignee: GreatCall, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,158

(22) Filed: Feb. 11, 2011

(65) Prior Publication Data

US 2012/0208490 A1 Aug. 16, 2012

(51) Int. Cl.
*H04M 11/04* (2006.01)

(52) U.S. Cl.
USPC .......... 455/404.2; 455/414.3; 455/456.1; 455/456.2; 455/456.4; 455/456.6; 455/404.1

(58) Field of Classification Search
USPC .......... 455/404.1, 404.2, 456.1, 414.3, 456.2, 455/456.4, 456.6
See application file for complete search history.

(56) References Cited

U.S. PATENT DOCUMENTS

| 3,663,762 | A | 5/1972 | Joel, Jr. |
| 4,144,411 | A | 3/1979 | Frenkiel |
| 5,797,093 | A | 8/1998 | Houde |
| 6,044,257 | A | 3/2000 | Boling et al. |
| 6,226,510 | B1 | 5/2001 | Boling et al. |
| 6,574,484 | B1 | 6/2003 | Carley |
| 6,636,732 | B1 | 10/2003 | Boling et al. |
| 7,092,695 | B1 | 8/2006 | Boling et al. |
| 7,257,413 | B2 | 8/2007 | Sheynblat |
| 7,286,860 | B2 | 10/2007 | Harris |
| 7,315,735 | B2 | 1/2008 | Graham |
| 7,706,831 | B2 | 4/2010 | Richardson et al. |
| 7,890,134 | B2 | 2/2011 | Richardson et al. |
| 8,005,456 | B2 * | 8/2011 | Buehler et al. ............. 455/404.2 |
| 2002/0118723 | A1 | 8/2002 | McCrady et al. |
| 2005/0085257 | A1 | 4/2005 | Laird et al. |
| 2006/0003809 | A1 | 1/2006 | Boling et al. |
| 2007/0087765 | A1 | 4/2007 | Richardson et al. |
| 2008/0012760 | A1 | 1/2008 | Derrick et al. |
| 2008/0012761 | A1 | 1/2008 | Derrick et al. |
| 2008/0166990 | A1 | 7/2008 | Toiv |
| 2008/0166992 | A1 | 7/2008 | Ricordi et al. |
| 2008/0248815 | A1 | 10/2008 | Busch |
| 2008/0293436 | A1 * | 11/2008 | Fok et al. .................. 455/456.2 |
| 2009/0221263 | A1 | 9/2009 | Titus et al. |
| 2009/0309709 | A1 * | 12/2009 | Bevacqua et al. ........ 340/426.18 |
| 2010/0020776 | A1 | 1/2010 | Youssef et al. |
| 2010/0093372 | A1 * | 4/2010 | Timiri et al. .............. 455/456.2 |

(Continued)

*Primary Examiner* — Patrick Edouard
*Assistant Examiner* — Shantell L Heiber
(74) *Attorney, Agent, or Firm* — Kilpatrick Townsend & Stockton LLP

(57) ABSTRACT

In one embodiment, the present disclosure provides a method, system and device for determining information about a location of the mobile device. The mobile device is configured to contact a private response call center (PRCC), e.g., by pressing or selecting one or more buttons or a softmenu. A PRCC operator can identify a potential emergency situation and, upon such an identification, initiate a conference call between a PRCC operator, a user of the mobile device, and a public safety answering point (PSAP) operator. The mobile device may transmit location information previously determined before PRCC call and be commanded to gather new location information during the call. The mobile device may also, while on a call with the PRCC, determine and transmit to the PRCC location information.

16 Claims, 12 Drawing Sheets

U.S. PATENT DOCUMENTS

| | | |
|---|---|---|
| 2010/0159943 A1 | 6/2010 | Salmon |
| 2010/0256992 A1 | 10/2010 | Roberts et al. |
| 2011/0003576 A1 | 1/2011 | Sun et al. |
| 2011/0045797 A1 * | 2/2011 | Fee .......................... 455/404.2 |
| 2011/0111736 A1 | 5/2011 | Dalton et al. |
| 2011/0151829 A1 | 6/2011 | Velusamy et al. |
| 2012/0171988 A1 | 7/2012 | Matsuo et al. |
| 2012/0171989 A1 | 7/2012 | Matsuo et al. |
| 2012/0208491 A1 | 8/2012 | Imming et al. |

* cited by examiner

SYSTEMS AND METHODS FOR IDENTIFYING CALLER LOCATIONS

BACKGROUND OF THE INVENTION

This disclosure relates in general to determining information about a location of a mobile device and, but not by way of limitation, to transmitting such real-time information to an public safety answering point (PSAP) amongst other things.

Nearly all locations within the United States and Canada are now served by "911" emergency telephone service, and many other countries have similar services that can have a different telephone number. In the 911 system, calls to the telephone number 9-1-1 are specially routed to a PSAP, where a specially-trained dispatcher can assess the nature of the emergency, offer assistance, dispatch emergency services or law enforcement personnel to the source of the call, or provide other services. Many PSAPs are interconnected to allow routing calls and other information between them.

The 911 service facilitates rapid response by the appropriate authorities in cases of emergency. However, sending the appropriate authorities to the scene of an emergency requires information about the location of the emergency. While a call from a land line can be easily attributed to an address associated with the number. It is less certain that a call from a mobile device can be traced to a particular address, and accountholder address is certainly less accurate at any given moment than that for a land line.

The location finding technology available to PSAPs is not generally accessible to other third parties that might be called or even to application layer software on the phone. Tracing the location by a third party is not possible today. If the individual is unable to sufficiently articulate and describe his location, the third party cannot determine where to send emergency personnel.

BRIEF SUMMARY OF THE INVENTION

In one embodiment, the present disclosure provides a method, system and device for determining information about a location of the mobile device. The mobile device is configured to contact a private response call center (PRCC), e.g., by pressing or selecting one or more buttons or a softmenu. A PRCC operator can identify a potential emergency situation and, upon such an identification, initiate a conference call between a PRCC operator, a user of the mobile device, and a public safety answering point (PSAP) operator. The mobile device may transmit location information previously determined before PRCC call and be commanded to gather new location information during the call. The mobile device may also, while on a call with the PRCC, determine and transmit to the PRCC location information.

In another embodiment, a wireless communication system with enhanced location processing for a number of mobile devices using the wireless communication system is disclosed. The wireless communication system includes a first interface to a public safety answering point (PSAP), a second interface to a private response call center (PRCC) and a mobile device. The mobile device includes a location determining function, an input interface, and a first and second communication functions. The location determining function operates in a first mode and second mode. The input interface is configured to receive user inputs, where transition from the first mode to the second mode is triggered by the user inputs. The first communication function is configured to have a wireless voice call with the PRCC triggered by the user inputs. The second communication function is configured to wirelessly pass location information to the PRCC in the second mode. Location determinations are made by the location determining function in the first mode at a rate slower than location determinations in the second mode. Location determinations are made by the location determining function in a call connected state in the second mode.

In yet another embodiment, a mobile device for wirelessly communicating with a private response call center (PRCC) is disclosed. The mobile device includes a location determining function, an input interface, and a first and second communication functions. The location determining function operates in a first mode and second mode. The input interface is configured to receive user inputs, where transition from the first mode to the second mode is triggered by the user inputs. The first communication function is configured to have a wireless voice call with the PRCC triggered by the user inputs. The second communication function is configured to wirelessly pass location information to the PRCC in the second mode. Location determinations are made by the location determining function in the first mode at a rate slower than location determinations in the second mode. Location determinations are made by the location determining function in a call connected state in the second mode.

In still another embodiment, a method for a mobile device to process information about its location that is sent to a PRCC. Location information is determined for the mobile device in a first mode. User inputs are received. A transition from a first mode to a second mode is triggered. A wireless communication over a wireless network to the PRCC in the second mode is initiated. The PRCC is called from the mobile device. Location information is sent to the PRCC using the wireless network. Location information is determined for the mobile device in the second mode. Updated location information is sent to the PRCC in the second mode using the wireless network while in a call-connected state.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
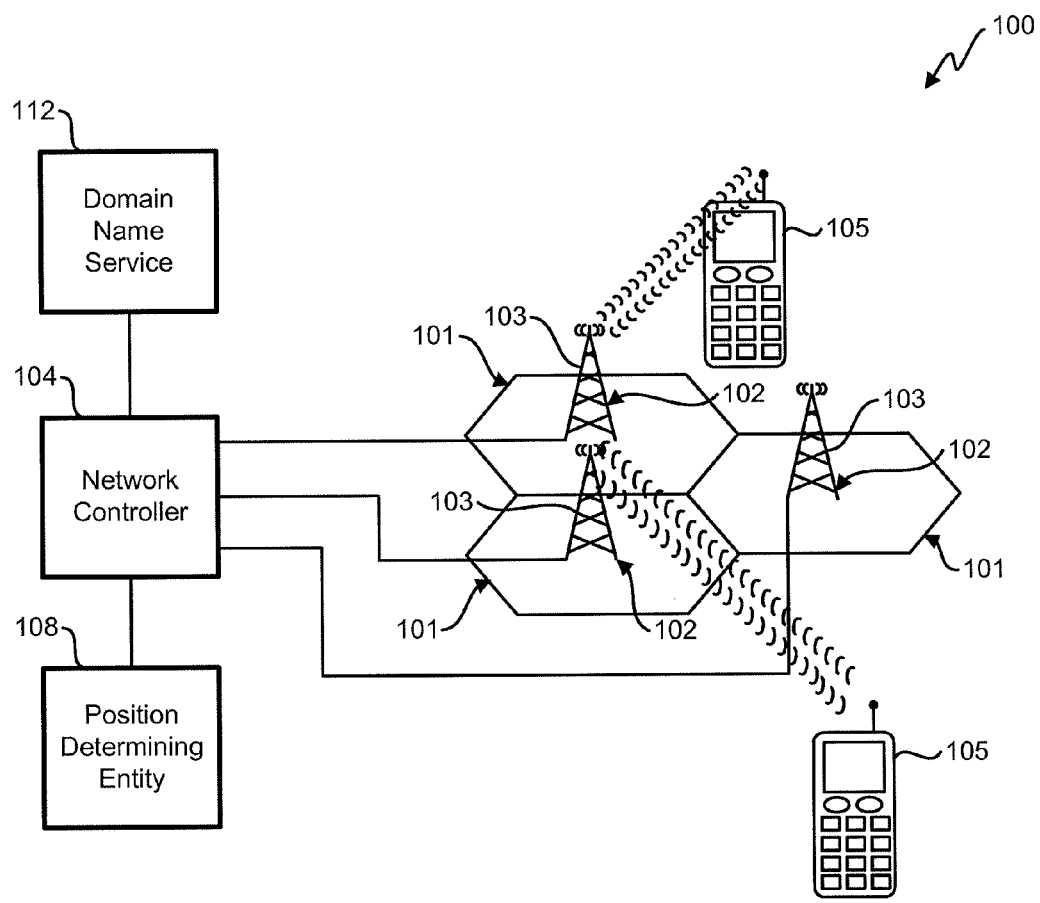
FIG. 1 depicts a schematic diagram of an embodiment of a mobile device network.

Referring initially to FIG. 1, a schematic diagram of an embodiment of a mobile device network 100 is shown. Each cell 101 is served by one or more base stations 102, which includes a number of antenna mounted on a tower 103. Each mobile device 105 active in a particular cell can bi-directionally interact with the base station of the cell, enabling full duplex communication of data and/or voice. Mobile device 105 may include, for example, a cellular phone, a medical alert pendant, a smartphone, or a personal digital assistant. Each cell 101 is capable of communicating with mobile device 105 within the respective cell 101 according to a physical interface scheme (e.g., CDMA, LTE, HSPA, GSM, GPRS, WiMax, etc.). Each base station 102 is capable of communicating simultaneously with many different mobile devices 105. Although not shown, there are several overlapping mobile device networks to service mobile devices from different carriers.

Adjacent cells 101 use various diversity techniques to avoid interference. In this way, many mobile devices can be supported using a limited spectra. While only three cells 101 are shown, many more cells 101 are present in a typical mobile device network 100. Special hand-off protocols may be used for maintaining communication with a particular mobile device 105 that moves from one cell 101 to another during a call.

Each base station 102 communicates with a network controller 104. The network controller 104 routes communications (e.g., calls and data) between cells 101 and outside (e.g., telephone and Internet) providers, monitor device usage, maintain billing records for individual device accounts, perform diagnostic tests, and perform many other functions.

When performing a mobile subscriber assisted (MS-A) location determination, the mobile device 105 first queries a domain name service (DNS) 112 for the address of the position determining entity (PDE) 108. After knowing the address, the PDE 108 is called to assist in determining the location of the mobile device 105. Trilateration with multiple base stations and/or ranging techniques can be used by the PDE to estimate location. When the mobile device performs a mobile subscriber based (MS-B) location determination using an internal circuit along performing data calls that will produce the almanac and ephemeris information. The PDE 108 also provides almanac and ephemeris (A&E) information to aid the mobile device 105 in determining location with subsequent MS-B request. The A&E information is used on subsequent MS-B requests without using a data call. Should the A&E information become out of date or inaccurate, the next MS-B request will get new A&E information if a data connection is available.

Figure 2:
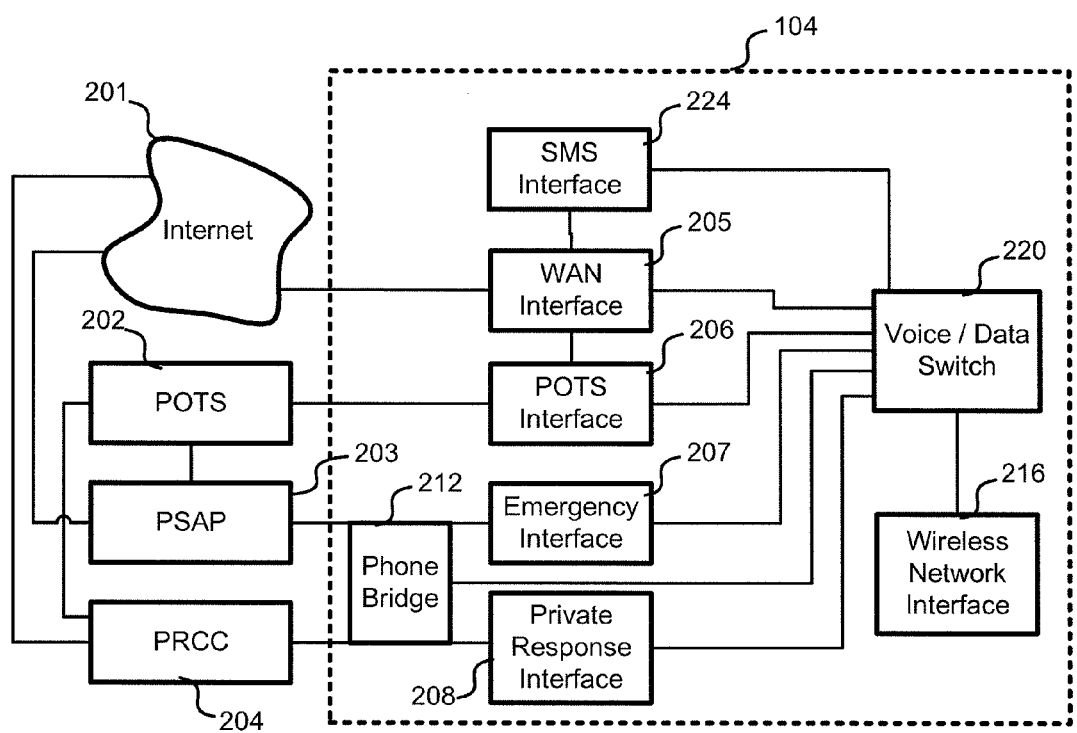
FIG. 2 depicts a block diagram of an embodiment of a network controller in communication with various other entities.

With reference to FIG. 2, a block diagram of an embodiment of a network controller 104 in communication with the Internet 201, a plain old telephone system (POTS) 202, a public safety answering point (PSAP) 203, and a private response call center (PRCC) 204 is shown. A wide area network (WAN) interface 205, a POTS interface 206, a SMS interface 224, an emergency interface 207, and a private response interface 208 are shown, but the network controller 104 may also include other interfaces between network 100 and other networks, organizations, or services. For example, there could be other interfaces to location services, data services, billing systems, toll-free number routing services, etc.

Although it could be elsewhere in the network controller 104, a phone bridge 212 can create a three-way call with the end user, PSAP personnel and the PRCC personnel. Where there is an emergency that should not be handled by the PRCC 204, the end user is connected to the PSAP 203 and the PRCC personnel may or may not remain on the line. In other embodiments, the three way call is initiated on the mobile device 105.

WAN interface 205 connects network 100 with the Internet 201. The Internet 201 is a global system of interconnected computer networks, and enables digital communication between computers. Applications of the Internet 201 include the carrying of electronic mail, audio and video feeds, voice over Internet protocol (VoIP), and other kinds of digital messages. One especially popular use of the Internet 201 is for the hosting and viewing of interlinked documents on the World Wide Web. Many modern mobile devices 105, including cellular telephones of the kind supported by network 100, include the capability to access documents and communications through the Internet 201, for example sending and receiving electronic mail and viewing web pages. Other embodiments could us a wide area network (WAN) separate from or tunneled through the Internet 201.

SMS messages to and from the mobile devices 105 are relayed by the SMS interface 224 through the WAN interface 205 and onto the Internet 201. Connections to different SMS systems are performed through the Internet 201 so that any SMS message can be sent or received from any two mobile devices 105 regardless of country or carrier. The Internet 201 is used for data channels to the PSAP 203 and PRCC 204, for example, to send location requests and location determinations. Phone calls to the PSAP 203 and PRCC 204 could be over the Internet 201 using VoIP technology instead of POTS 202.

POTS interface 206 connects network 100 with the plain old telephone system (POTS) 202. POTS 202 comprise, for example, a large number of traditional wireline telephones and other communications equipment, as well as the infrastructure required to support them. Many residential and small business telephones are part of POTS 202, which may still support telephone hardware. POTS interface 206 enables users of mobile devices that are part of network 100 to call telephones that utilize POTS 202, and vice versa. Connections with the PSAP 203 and PRCC 204 can be over POTS 202.

Emergency interface 207 connects network 100 to PSAP 203, so that calls to the 911 emergency number made by mobile phone users on network 100 can be routed to a PSAP 203 or routed between multiple PSAPs 203. The PSAP 203 may be additionally served by POTS 202, VoIP or by another communication system. Although users dial 9-1-1 to reach emergency responders in some countries, others may have a different number that is dialed. In any event, most phone systems have a segregated emergency response service that has special routing, priorities and safeguards, which are not fully accessible to other services that might be designed for the system 100. These regulatory safeguards protect the emergency interface 207 when communicating with the PSAP 203. There are similar safeguards on the mobile devices 105 to keep software in the user plane from interacting with the emergency call routing of the control plane.

Private response interface 208 connects network 100 to PRCC 204. For example, PRCC 204 may be operated by a service provider who offers personalized assistance to phone users who subscribe to the service. In some embodiments, the service provider may offer personal health management advice, concierge services, navigational assistance, roadside assistance, car unlock services, car status information, technical support for telephones used in conjunction with the service, or other kinds of personalized services deliverable by telephone. PRCC 204 may be staffed by customer service representatives who answer inquiries from users of the service. Such a service may especially appeal to users with safety concerns or health or other impairments. For example, the service could include weekly or daily calls to the user for verification that the user is doing well, and if not, the customer service representative may offer to contact a family member, health care provider, or other resource that may be helpful to the client. The service could include these and other services sold as a package. U.S. application Ser. No. 12/981,822, which is incorporated by reference in its entirety, provides further embodiments and descriptions related to, for example, PRCC 204 and mobile devices.

In one example scenario, the service provider that operates the PRCC 204 may also be a mobile-device service provider, and may offer a private assistance service as an adjunct to mobile-device service. The PRCC 204 can be contacted for non-emergency service through a phone number, a dedicated button, screen softbutton, speed dial, or other shortcut, for example by activating a 5-* key combination. Software on the phone would recognize the special key combination to enter an alarm state. The connection between network controller 104 and PRCC 204 could be by way of the Internet 201, a wireless connection, a VoIP connection, a cellular telephone connection, POTS 202, or any other suitable connection method that enables a telephone user to reach PRCC 204.

Figure 3:
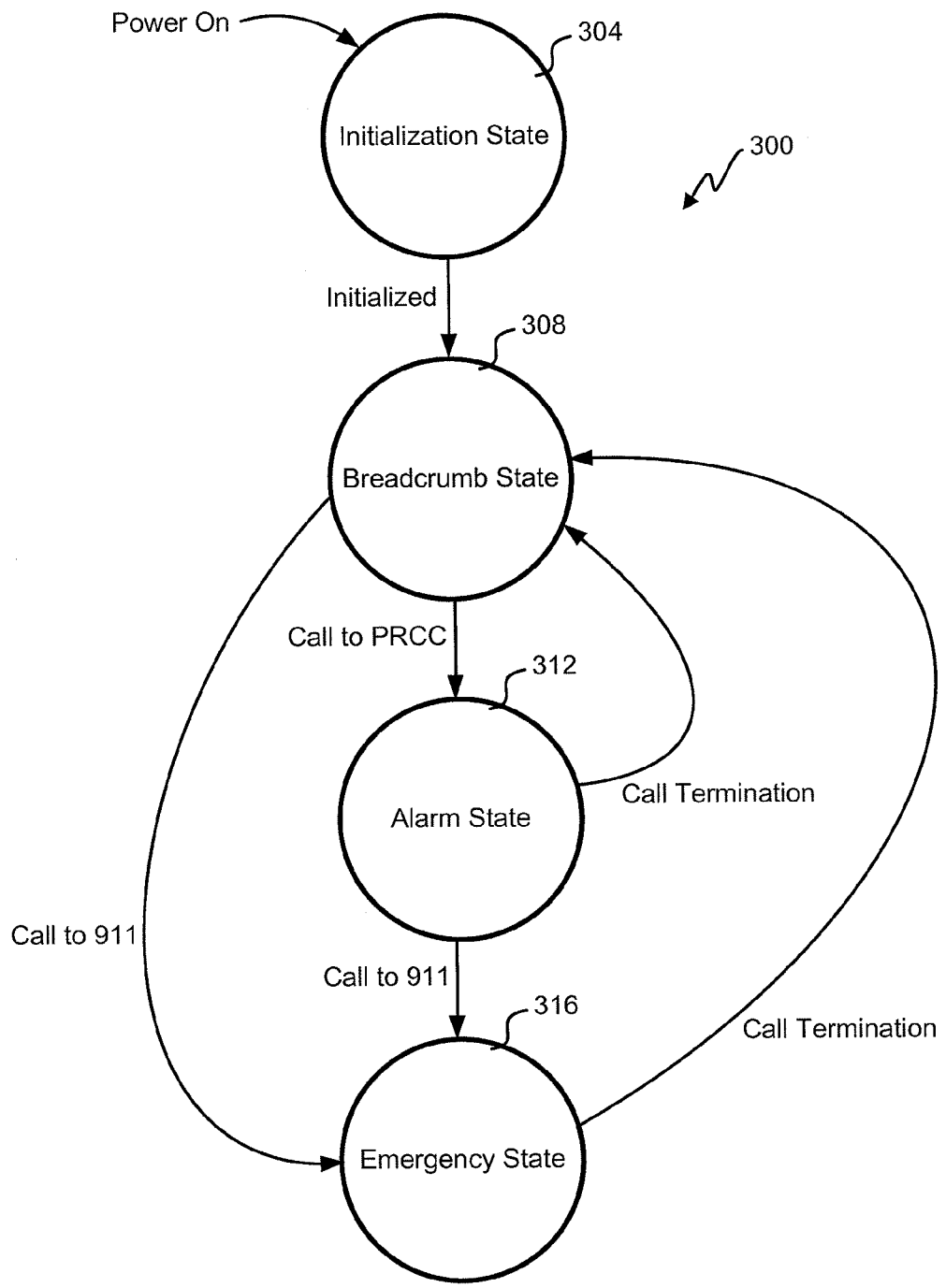
FIG. 3 depicts a state diagram of one embodiment of states that are performed by a handset.

Referring next to FIG. 3, a state diagram 300 of one embodiment of states that are performed by a mobile device 105 is shown. This is not an exhaustive list of all the states of the mobile device 105 are possible, but details the states associated with location gathering for various calls to the PSAP 203 and PRCC 204. This state diagram operates separately from any regulated emergency location function in the control plane of the mobile device 105.

Upon power-up of the mobile device 105, an initialization state 304 is entered. A MS-A location request is performed to get an initial location fix. Breadcrumbing state 308 is next and is the normal state of operation. In the breadcrumbing state 308, periodic MS-B locations are recorded in the mobile device 105 along with A&E information that is updated when needed. Upon a call to the PRCC 204 through the 5-* key combination or activation of the softmenu, operation transitions to the alarm state 312. In this embodiment, location fixes are performed every 20 minutes, but other embodiments could perform location fixes more frequently than every one, two, three, five, ten, fifteen, thirty, or sixty minutes.

In the alarm state 312, the last location gathered in the breadcrumbing state 308 is reported to the PRCC 204 using a channel outside the voice channel. This embodiment uses a SMS channel to send location information, but other embodiments could use a data channel or tones on the voice channel. The PRCC 204 will request updated MS-B location determinations using a SMS message. The messaging back and forth using the SMS channel is opaque to the user of the mobile device 105 such that the SMS messages are not discoverable during normal operation by the user. With updated location information, the PRCC 204 can better assist the user resolve the issue that prompted the call. Regular location fixes are sent in the alarm state 312, for example, less than every 5, 10, 15, 20, 30, 45, 60, or 90 seconds.

Occasionally, the operator at the PRCC 204 determines the caller has an emergency of the type best handled by the PSAP 203. Alternatively, the user can call 911 directly from the breadcrumbing state 308. In any event, the PSAP 203 is dialed upon entry to the emergency state 316. When transitioning from the alarm state 312, the operator from the PRCC 204 can remain on the line in a three-way call to assist the user who may be impaired in some way. Of course, the user can ask that the PRCC operator exit the call. In some embodiments, when the user calls 911 from the breadcrumbing state 308, a PRCC operator is also called to be able to join the conversation with additional information.

Figure 4:
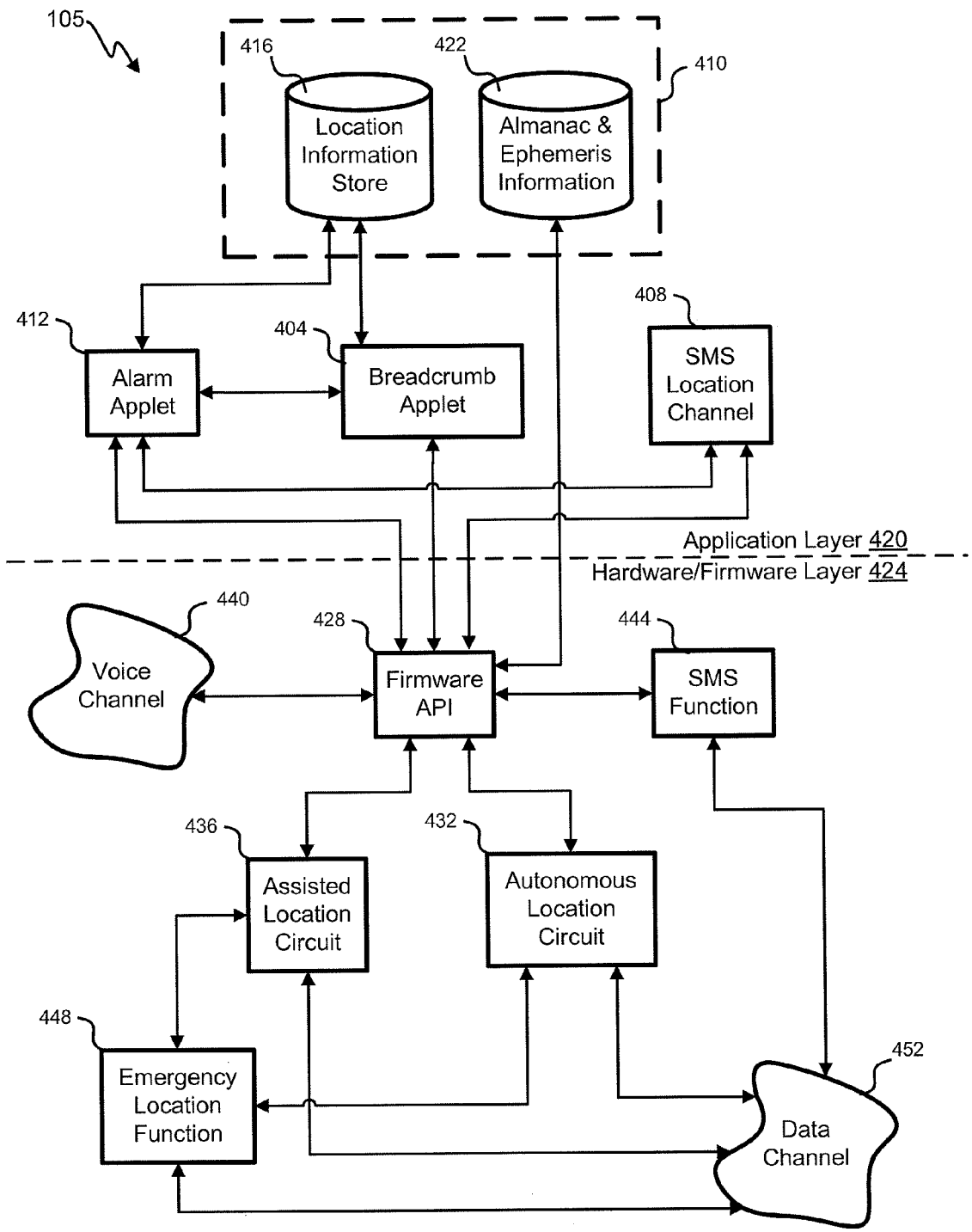
FIG. 4 depicts a block diagram of an embodiment of a mobile device.

With reference to FIG. 4, an embodiment of a block diagram of a mobile device 105 is shown. Mobile device 105 includes a radio transceiver for communicating with network 100 and an input interface (e.g., button(s), keypad, touch screen, voice recognition, etc) for receiving inputs from the user of mobile device 105. Operation of the functions of the mobile device 105 are separated into planes or layers. In this embodiment, there is an application layer 420 where applets are run long with storing information in a electronic file system (EFS) 410. The EFS could be any number of storage media either built-into the phone or placed in a socket (e.g., flash, RAM, removable flash card, etc.) A firmware/hardware layer 424 has a firmware application programming interface (API) only allowing certain calls from the application layer 420. Defined APIs allow making calls, sending SMS, making data calls, performing location determinations, or other functionality defined by the hardware of the mobile device 105 and the associated firmware.

The EFS 410 stores many different types of information such as contacts, messages, photos, video, music, or anything else that might reside on the mobile device 105. Pertinent here, the EFS 410 has a location information store 416 holding valid location determinations found using the breadcrumb applet 404. Additionally, there is an almanac and ephemeris information store 422 that holds the latest A&E information found with a MS-B location determination. To perform a MS-B location determination, any prior almanac and ephemeris information 422 is retrieved from the EFS 410 and provided to an autonomous location circuit 432. If the A&E information is bad, new A&E information is retrieved and stored on the EFS 410.

The breadcrumb applet 404 takes care of the initialization and breadcrumb states 304, 308. MS-A and MS-B location requests are performed by the breadcrumb applet 404 and valid results are stored in the location information store 416. Along with a location result, an estimated accuracy and a timestamp are stored in the EFS 410. The breadcrumb applet 404 makes the BREW™ iPosDet call to the firmware API 428. The validity and update of the almanac and ephemeris information 422 is also performed by the breadcrumb applet 404.

The alarm state 312 corresponds to a phone connection with the PRCC 204, however that call is initiated. The alarm applet 412 triggers the breadcrumb applet 404 to perform MS-B location updates upon prompts received on the SMS location channel 408. In this embodiment, the data channel 452 cannot be used for normal data calls so the SMS location channel 408 provides for two-way data communication between the mobile device 105 and the PRCC 204. The updated MS-B location determination can be read by the alarm applet 412 from the location information store 416 before relay back to the PRCC 204.

The SMS location channel 408 interacts with a SMS function in the hardware/firmware layer 424 by way of the firmware API 428. The SMS messages pass through the data channel 452 unimpeded during use of the voice channel 440. Other phone systems allow use of the data channel 452 during a phone call so the SMS location channel would be unnecessary in favor of normal data packet communication with the PRCC 204.

The chipset of the current embodiment supports an assisted location circuit 436 and an autonomous location circuit 432. Both circuits 432, 436 are used by an emergency location function 448 of the regulated 911 function. The emergency location function 448 cannot be accessed by the application layer 420 in this embodiment. Other embodiments could use the emergency location function 448 to get the location fixes without a complex process of calls.

The assisted location circuit 436 is used for MS-A location calls and the autonomous location circuit 432 is used for MS-B location calls. Using trilateration and ranging with base stations 102, the assisted location circuit 436 uses the system 100 to estimate location as prompted in a MS-A call. Additionally, a data call is made on the data channel 452 to get the location fix to complete the MS-A location call. Because the data call is not possible while the voice channel is being used in this embodiment, only MS-B location calls with valid A&E information are performed while the voice channel is in use. The autonomous location circuit uses GPS or other techniques to determine location without a data call each time. Accurate almanac and ephemeris information 422 is proved to the autonomous location circuit 432 in this embodiment before a valid MS-B location fix can be determined.

Figure 5:
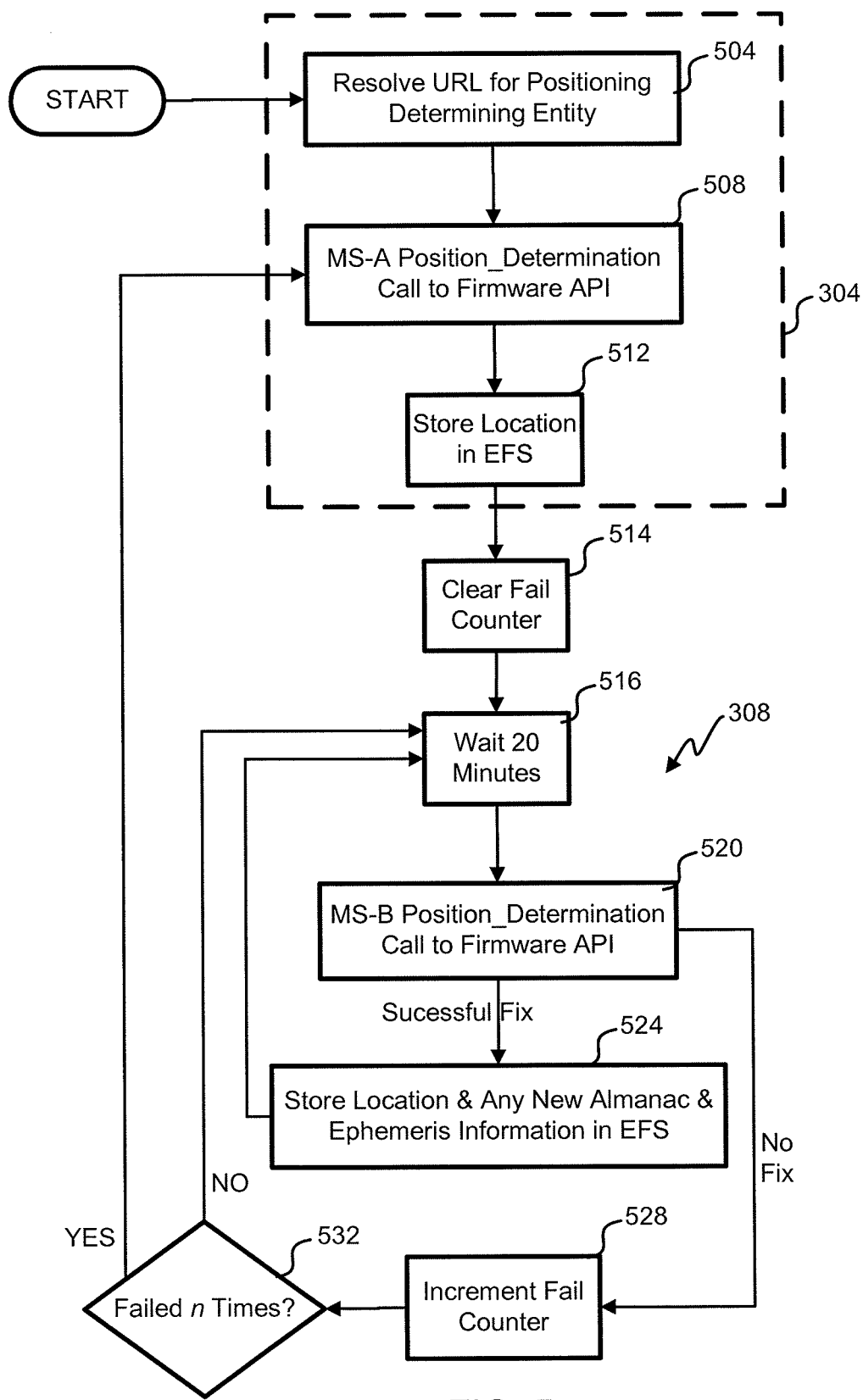
FIG. 5 illustrates a flowchart of an embodiment of a process for the initialization and breadcrumbing states.

Referring next to FIG. 5, a flowchart of an embodiment of a process 500 for the initialization and breadcrumbing states 304, 308 is shown. The depicted portion of the process begins upon entry into the initialization state 304 in block 504. The PDE has a URL that is resolved using the DNS 112 to an IP address. That IP address is stored for later use. In block 508, a MS-A Position_determination call is made to the firmware API 428. The resulting location fix is stored in the EFS 410 in block 512.

In preparation for a loop of activity, the clear_counter value is reset in block 514 and a wait of 20 minutes is performed in block 516. By agreement, the data channel 452 is to be queried no more frequently than every 15 minutes for location fixes. The 20 minute holding block 516 assures that location fixes are not any more frequent than desired. Other embodiments could avoid bock 516 or have a different value to wait. Now in the breadcrumbing state 308, block 520 performs a MS-B Position_determination call to the firmware API 428. Almanac and ephemeris information 422 is provided as part of the MS-B call. Should a valid location determination be made, it is stored in the EFS 410 in block 524 before looping back to block 516 to wait before gathering the next location fix.

Should no MS-B location be obtained in block 520, processing jumps to block 528 where the fail_counter is incremented. The MS-B location fix could fail because the autonomous location circuit 432 received faulty or out of date almanac and ephemeris information or that the satellites or other beacons cannot be found to properly trilaterate a location. In block 532, it is determined if the fail_counter is n or more (e.g., n could be equal to 2, 3, 4, 5, 6, or more). Where there are less than n failures, the loop including blocks 516 and 520 are attempted again.

Where there are n MS-B failures in a row, processing goes from block 532 to block 508. Where there has been no MS-A request in the last hour, processing goes from block 532 to block 508 to perform a MS-A location fix before looping through the other blocks. This process robustly gathers location information periodically without overtaxing the data channel 452.

Figure 6A:
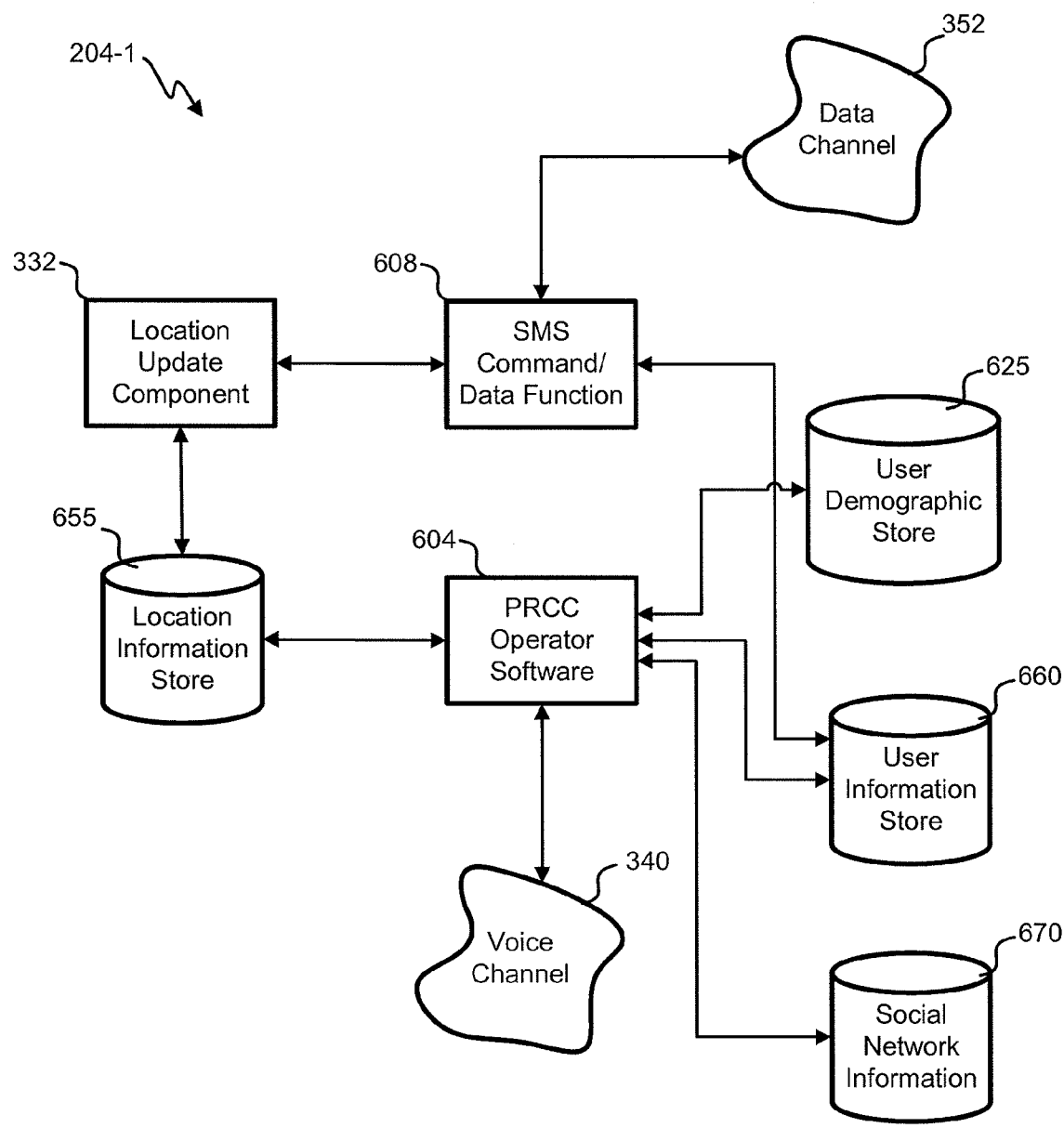
FIGS. 6A and 6B depict block diagrams of embodiments of a private response call center (PRCC) system.

With reference to FIG. 6A, a block diagram of an embodiment of a PRCC 204-1 is shown. PRCC 204-1 includes a data channel 352 and voice channel 340 for communicating with network 100, but could use other wired or wireless connections in other embodiments. The data channel 352 communicates through SMS during a phone call with a subscribing user in this embodiment. The PRCC 204 also includes an input interface for receiving inputs from an operator of PRCC 204, for example, a microphone, a multi-key keypad, a touch screen or other input devices. Also, a display is included for communicating information to the operator, for example, an LCD screen, a CRT screen, a projector, or another kind of display capable of showing graphical or alphanumeric information.

PRCC operator software 604 runs on a general purpose computer with interfaces to the voice channel 340 and a SMS command/data function 608. Calls from the mobile devices 105 are received on the voice channel 340. A call to the PSAP 203 can also be initiated over the voice channel using a phone bridge 212 to optionally make a three-way call. The voice channel 340 could be POTS 202, wireless or VoIP.

The PRCC operator software 604 has access to enhanced information on each caller. Demographic information 625 is stored for the subscribing users. Additionally, a user information store 660 holds special information unique to the situation of the subscribing user, for example, medications, treatment regiment, doctors, allergies, automobiles, work addresses, alternative phone numbers, contact information for relatives, etc. Some mobile devices 105 have medical sensors or equipment built-in or linked to the mobile device 105 (e.g., EKG, blood-glucose, heart rate, etc.). Medical readings can be stored in the user information store 660. The user information store 660 gives a much richer picture of the subscribing user than the PSAP 203 would have. The PRCC operator can advocate and explain things to the PSAP 203 in an emergency where the subscribing user is likely impaired.

The information stored in the user information store 625 could be historical or live. Live information is sent on the SMS channel or another data channel while connected on the phone with the user. The user information store 625 could draw information from the phone while in a call-connected state by gathering information stored on the phone or associated with the account (e.g., calling logs, voicemail, contact lists, stored or live photos, stored or live video). The live video and photos could be displayed by the PRCC operator software 604.

Additionally, a social network information store 670 holds information about the user's social network. Contact information for friends and family are available. Account information is available so that recent activity can be gathered for insight into the particular situation. For example, the user may not be able to speak at the moment, but there might be a tweet explaining a case of laryngitis. The location information of friends and family might be used to presume a location for the user when an accurate fix is not readily available. For example, a mother's location may be presumed knowing a toddler's current location.

Location information 655 is stored for the mobile device 105 of each subscribing user. The location information 655 includes the latest fix, but also includes historical location fixes. For situations where the current location is believed inaccurate or unknown, the historical information can provide likely locations. For example, the location could be roughly in a building where MS-A and MS-B fixes are rare, the historical information could be used to predict the location. Also, the work address from the user information store 660 may be used to predict if the subscribing user is near the building, he or she is likely on the floor of their work address.

Location information 655 also includes information about the current location. It could include localized weather, temperature from a weather service or read from a sensor on the phone, accelerometer and gyroscope information read by the phone. This information could be gathered live or from a historical log on the phone and/or the location information store. The accelerometer information could be analyzed to determine if the user is stationary or moving, running or walking, etc. The gyroscope information could be used to determine if the user is likely standing, on the ground or has dropped the mobile device 105.

The data channel 352 provides connectivity between the PRCC 204 and the mobile devices 105. The SMS command/data function 608 is the interface to the SMS data channel to provide two-way communication. A location update component 332 asks the mobile device 105 for a location update when the voice channel 340 is in use. In this embodiment, the SMS channel is available while the voice channel 340 is occupied. The location update component 332 records the location fixes in the location information store 655.

Figure 6B:
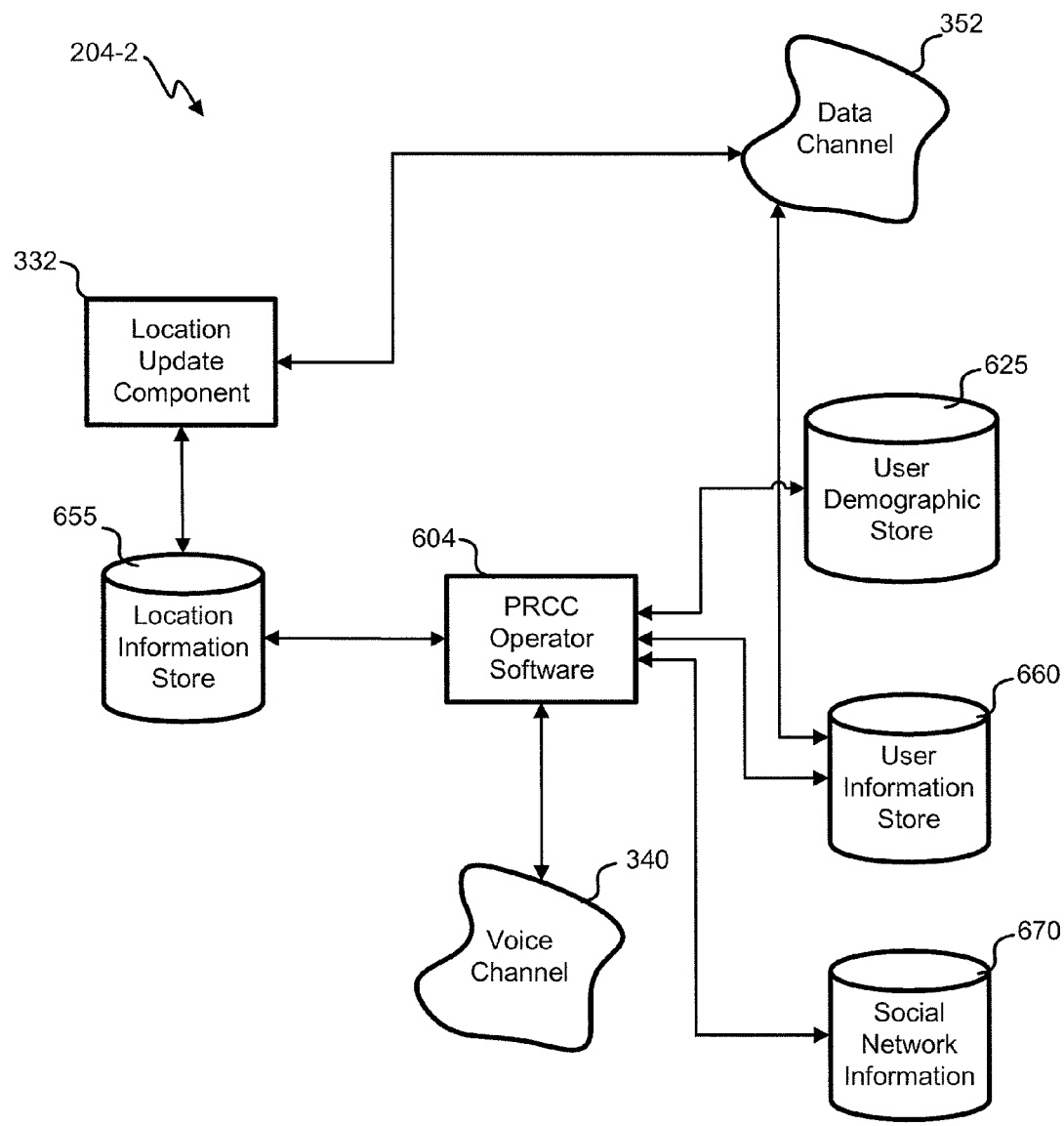

With reference to FIG. 6B, a block diagram of an embodiment of a PRCC 204-2 is shown. This embodiment sends information between the mobile device 105 and the PRCC 204-2 using the data channel 352 directly without having to rely upon SMS. Data freely flows over the data channel 352 or Internet. Phone systems that allow simultaneous voice and data communication use this embodiment.

Figure 7A:
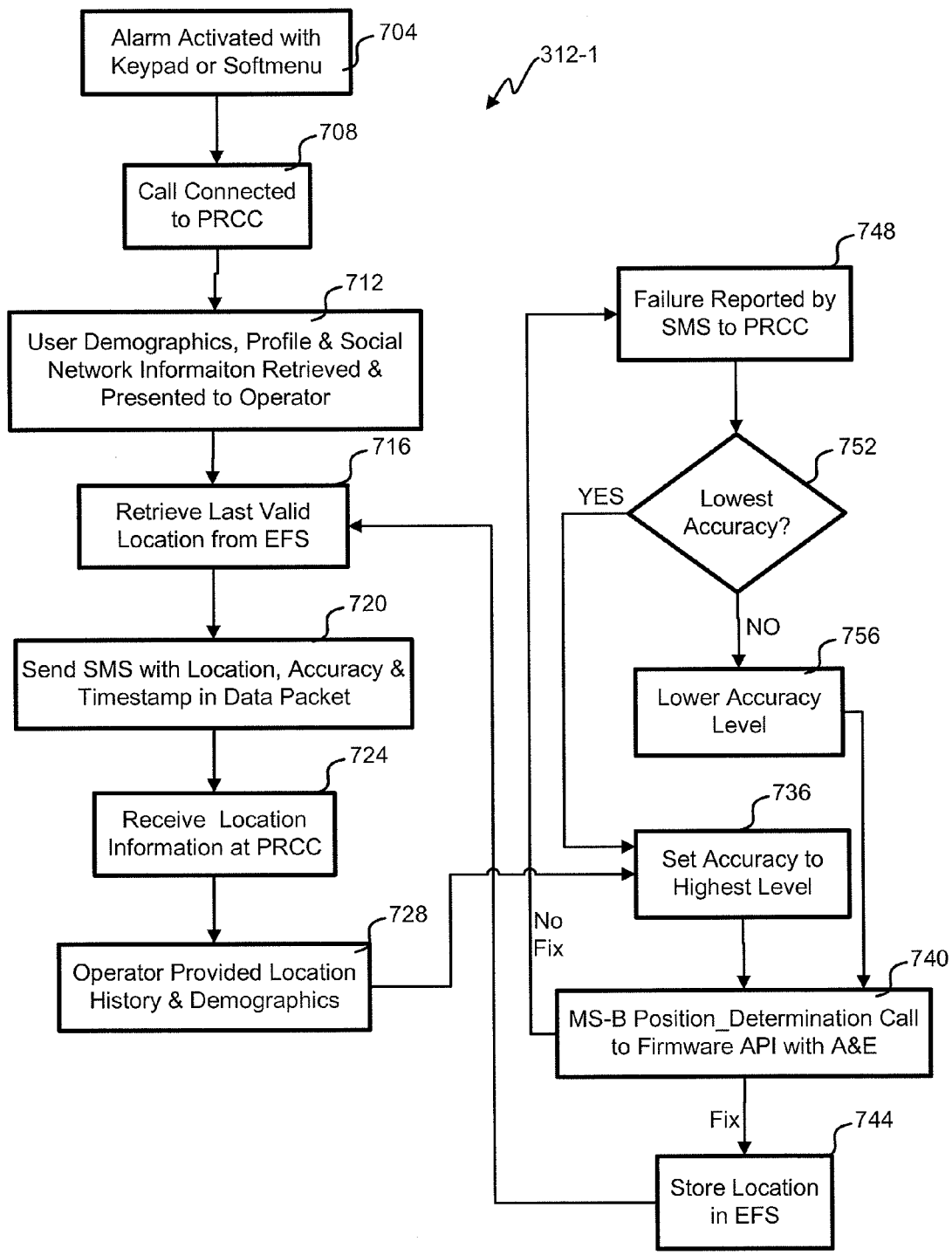
FIGS. 7A and 7B illustrate flowcharts of embodiments of a process for the alarm state.

Referring next to FIG. 7A, a flowchart of an embodiment of a process for the alarm state 312-1 is shown. The depicted portion of the process begins in block 704 where the alarm state 312 is activated with a keypad command, button press or softmenu activation. A call is placed to the PRCC 204 over the voice channel 340 in block 708. The user demographic information, user information and social networking stores 625, 660, 670 are automatically queried based upon a recognition of the caller ID information in block 712. The mobile device's 105 alarm applet 412 queries the EFS 410 for the last valid location in block 716.

In block 720, the alarm applet 412 for mobile device 105 sends the location information, when it was determined and its accuracy to the PRCC 204 using the SMS location channel 408. The location information is received in block 724 and provided to the operator in block 728. The location information is also stored at the PRCC 204. The location information is displayed by the PRCC operator software 604 so that the location context for the call is readily discernable. A heatmap of prior readings or dots for prior readings could be overlaid on a map around the user's current location.

It could be that the location information sent initially to the PRCC 204 is minutes old at least and could be even more stale. Location information is gathered in a loop of blocks to provide location information from the mobile device 105 to the PRCC 204. The mobile device 105 attempts to find the most accurate MS-B reading it can achieve in this embodiment. In block 736, the accuracy is set to its highest level. In block 740, a MS-B is requested. If found at that level of requested accuracy, the location fix is stored in the EFS in block 744 and sent back to the PRCC 204 by looping back to block 716.

Where the MS-B call fails in block 740, processing loops back to block 748 where the failure is reported back to the PRCC 204 on the SMS channel. Where the resolution isn't already at the lowest accuracy as determined in block 752, the accuracy requested is lowered in block 756 before attempting another MS-B fix in block 740 before doing another revolution in this loop. Should multiple loops have occurred lowering the accuracy in block 756 on each revolution, it is determined in block 752 that processing should jump to block 736 to set the accuracy to its highest level again before repeating this part of the process. In this way, the mobile device 105 is regularly and exhaustively attempting to get a MS-B location fix while in the alarm state 312.

Figure 7B:
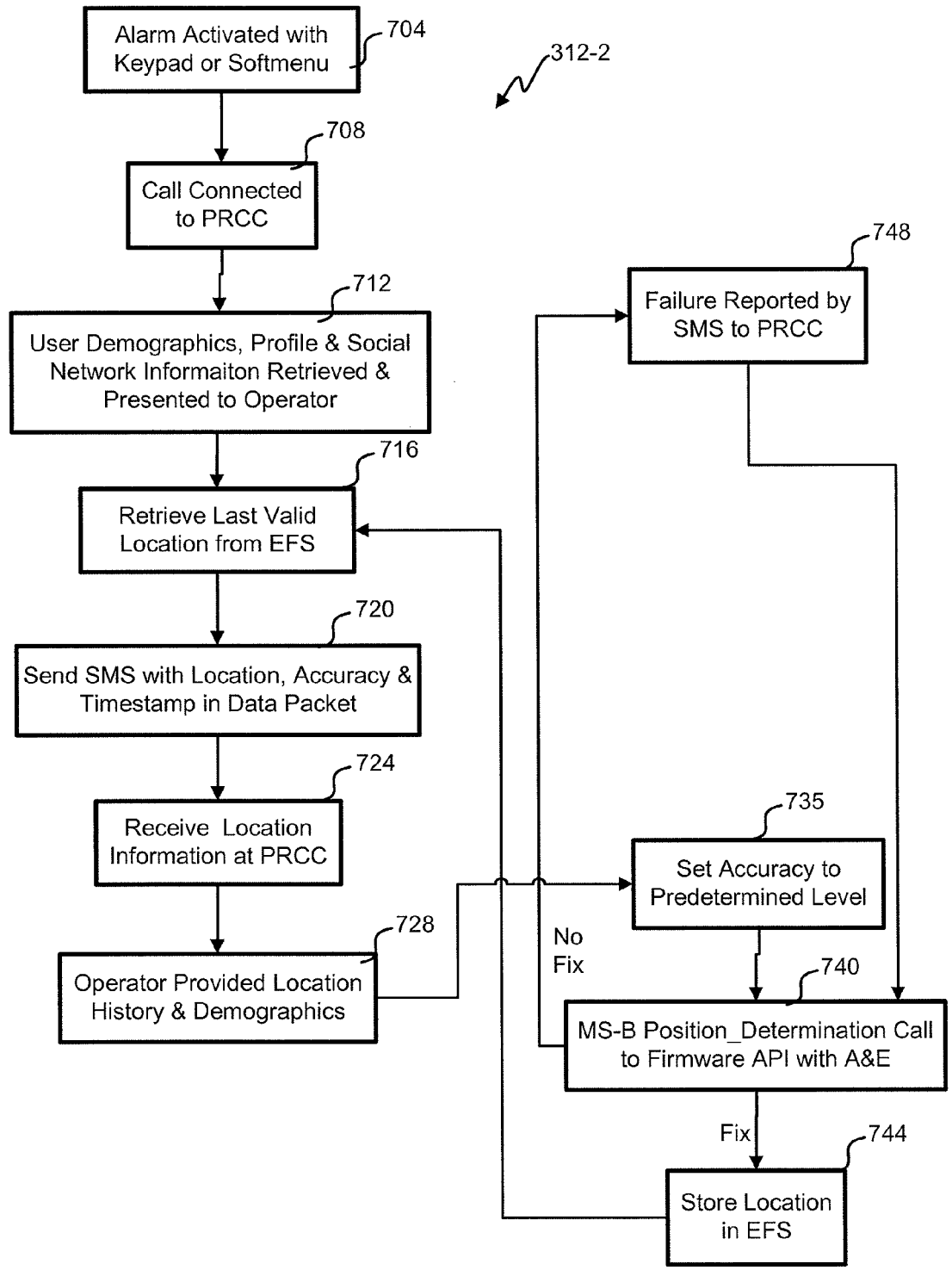

Referring next to FIG. 7B, a flowchart of an embodiment of a process for the alarm state 312-2 is shown. This embodiment does not iteratively try different levels of accuracy by removing blocks 752 and 756. Processing goes from block 728 to block 735 where a predetermined level of accuracy is set. Resolutions are either made or not in block 740 at the desired level of accuracy. The chipset provides the best position fix that it can, but the accuracy is not as clear in this embodiment when compared to the embodiment of FIG. 7A.

Figure 8:
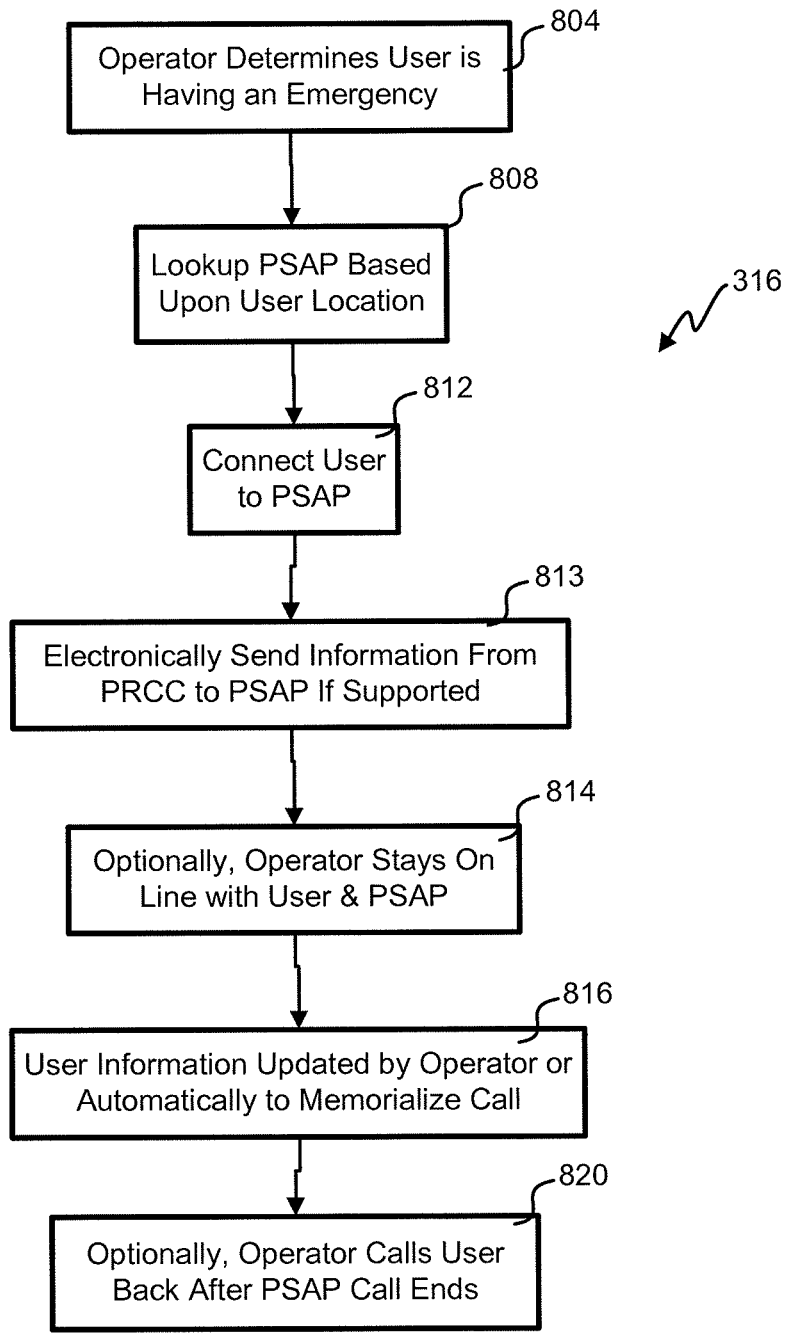
FIG. 8 illustrates a flowchart of an embodiment of a process for the emergency state.

With reference to FIG. 8, a flowchart of an embodiment of a process for the emergency state 316 is shown. The depicted portion of the process begins in block 804 where the PRCC operator concludes the user is having an actual emergency. The PRCC operator software 604 uses the location fix to find the appropriate PSAP 203 in block 808. The voice channel 340 is used in conjunction with the phone bridge 212 to initiate a three-way call in block 812. Should there be a supported datalink between the PRCC 204 and PSAP 203 some or all the information on the user can be passed to the PRCC 204 in block 813

The PRCC operator can optionally stay on the line to assist the user in interacting with the PSAP in block 814. The PRCC operator will update the user information store 660 with any pertinent information from the call in block 816. Some embodiments have a data link between the PSAP 203 and PRCC 204, that is automatically reconciled in block 816 so that the PRCC 204 knows the status and disposition from the activities of the PSAP 203. Optionally, the PRCC operator can call the user after the PSAP call ends to follow-up. For example, if there are signs of a heart attack that the PSAP 203 believes may be false indicators, the PRCC operator can call back in ten minutes to see if the user's symptoms have improved or gotten worse.

Figure 9:
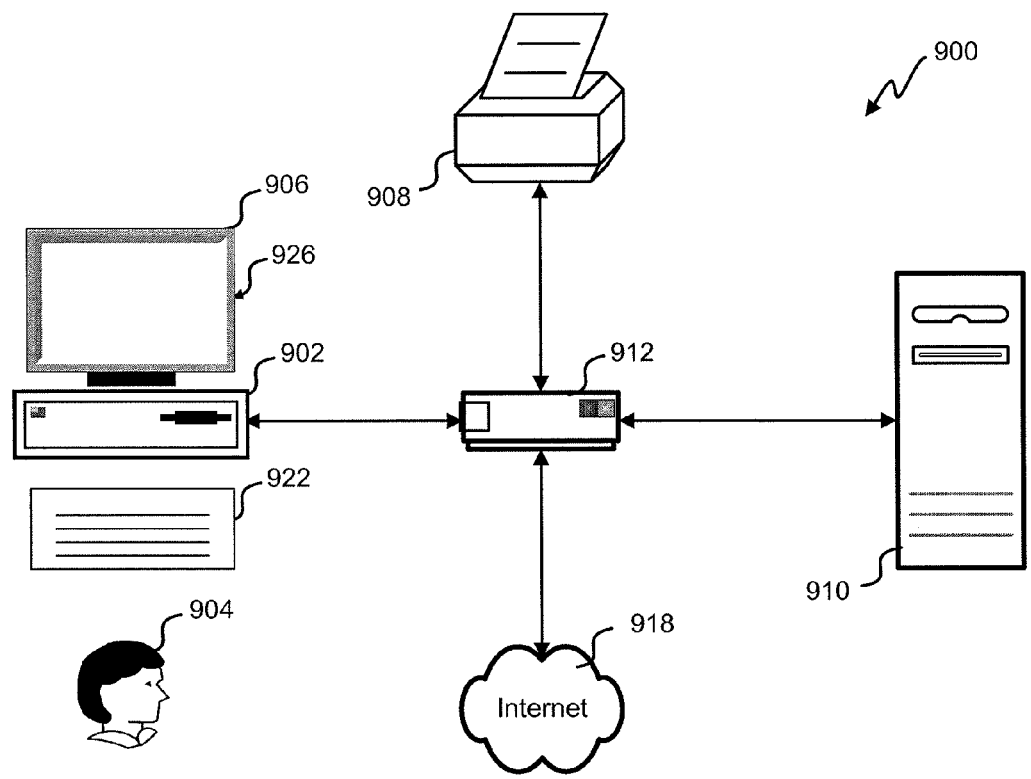
FIG. 9 depicts a block diagram of an embodiment of a computer system.

Referring next to FIG. 9, an exemplary environment with which embodiments may be implemented is shown with a computer system 900 that can be used by an operator in the PRCC 204, for example. The computer system 900 can include a computer 902, keyboard 922, a network router 912, a printer 908, and a monitor 906. The monitor 906, computer 902 and keyboard 922 are part of a computer system 926, which can be a laptop computer, desktop computer, handheld computer, mobile handset 105, mainframe computer, etc. The monitor 906 can be a CRT, flat screen, built-in display, etc.

An operator 904 can input commands into the computer 902 using various input devices, such as a mouse, keypad, keyboard 922, track ball, touch screen, etc. If the computer system 900 comprises a mainframe, an operator 904 can access the computer 902 using, for example, a terminal or terminal interface. Additionally, the computer system 926 may be connected to a printer 908 and a server 910 using a network router 912, which may connect to the Internet 918 or a WAN.

The server 910 may, for example, be used to store additional software programs and data. In one embodiment, software implementing the systems and methods described herein can be stored on a storage medium in the server 910. Thus, the software can be run from the storage medium in the server 910. In another embodiment, software implementing the systems and methods described herein can be stored on a storage medium in the computer 902. Thus, the software can be run from the storage medium in the computer system 926. Therefore, in this embodiment, the software can be used whether or not computer 902 is connected to network router 912. Printer 908 may be connected directly to computer 902, in which case, the computer system 926 can print whether or not it is connected to network router 912.

Figure 10:
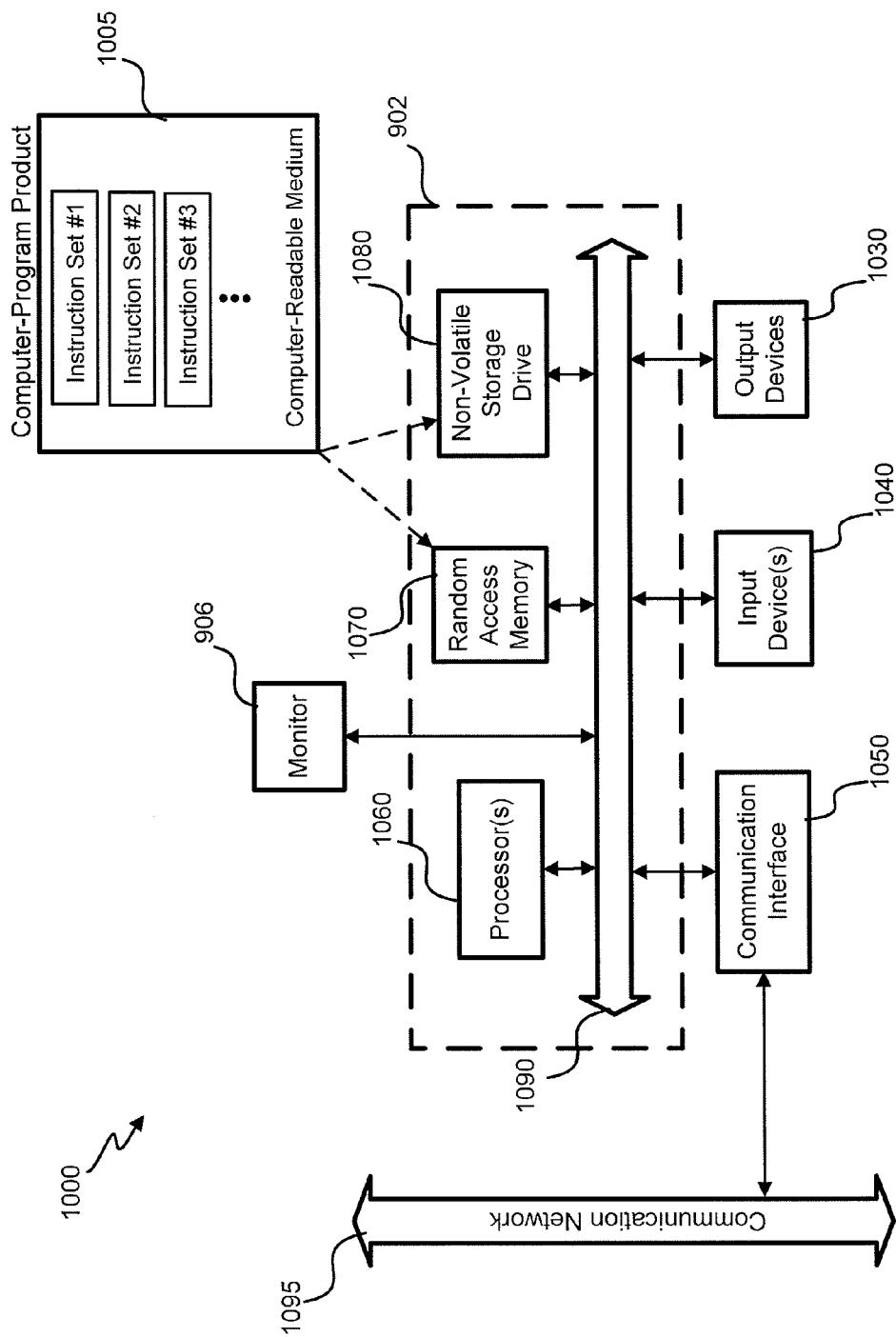
FIG. 10 depicts a block diagram of an embodiment of a special-purpose computer.

With reference to FIG. 10, an embodiment of a special-purpose computer system 1000 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 926, it is transformed into the special-purpose computer system 1000.

Special-purpose computer system 1000 comprises a computer 902, a monitor 906 coupled to computer 902, one or more additional user output devices 1030 (optional) coupled to computer 902, one or more user input devices 1040 (e.g., keyboard, mouse, track ball, touch screen) coupled to computer 902, an optional communications interface 1050 coupled to computer 902, a computer-program product 1005 stored in a tangible computer-readable memory in computer 902. Computer-program product 1005 directs system 1000 to perform the above-described methods. Computer 902 may include one or more processors 1060 that communicate with a number of peripheral devices via a bus subsystem 1090. These peripheral devices may include user output device(s) 1030, user input device(s) 1040, communications interface 1050, and a storage subsystem, such as random access memory (RAM) 1070 and non-volatile storage drive 1080 (e.g., disk drive, optical drive, solid state drive), which are forms of tangible computer-readable memory.

Computer-program product 1005 may be stored in non-volatile storage drive 1080 or another computer-readable medium accessible to computer 902 and loaded into memory 1070. Each processor 1060 may comprise a microprocessor, such as a microprocessor from Intel® or Advanced Micro Devices, Inc.®, or the like. To support computer-program product 1005, the computer 902 runs an operating system that handles the communications of product 1005 with the above-noted components, as well as the communications between the above-noted components in support of the computer-program product 1005. Exemplary operating systems include Windows® or the like from Microsoft Corporation, Solaris® from Oracle®, LINUX, UNIX, and the like.

User input devices 1040 include all possible types of devices and mechanisms to input information to computer system 902. These may include a keyboard, a keypad, a mouse, a scanner, a digital drawing pad, a touch screen incorporated into the display, audio input devices such as voice recognition systems, microphones, and other types of input devices. In various embodiments, user input devices 1040 are typically embodied as a computer mouse, a trackball, a track pad, a joystick, wireless remote, a drawing tablet, a voice command system. User input devices 1040 typically allow a user to select objects, icons, text and the like that appear on the monitor 906 via a command such as a click of a button or the like. User output devices 1030 include all possible types of devices and mechanisms to output information from computer 902. These may include a display (e.g., monitor 906), printers, non-visual displays such as audio output devices, etc.

Communications interface 1050 provides an interface to other communication networks and devices and may serve as an interface to receive data from and transmit data to other systems, WANs and/or the Internet 918. Embodiments of communications interface 1050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1050 may be coupled to a computer network, to a FireWire® bus, or the like. In other embodiments, communications interface 1050 may be physically integrated on the motherboard of computer 902, and/or may be a software program, or the like.

RAM 1070 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1070 and non-volatile storage drive 1080 may be configured to store the basic programming and data constructs that provide the functionality of various embodiments of the present invention, as described above.

Software instruction sets that provide the functionality of the present invention may be stored in RAM 1070 and non-volatile storage drive 1080. These instruction sets or code may be executed by the processor(s) 1060. RAM 1070 and non-volatile storage drive 1080 may also provide a repository to store data and data structures used in accordance with the present invention. RAM 1070 and non-volatile storage drive 1080 may include a number of memories including a main random access memory (RAM) to store of instructions and data during program execution and a read-only memory (ROM) in which fixed instructions are stored. RAM 1070 and non-volatile storage drive 1080 may include a file storage subsystem providing persistent (non-volatile) storage of program and/or data files. RAM 1070 and non-volatile storage drive 1080 may also include removable storage systems, such as removable flash memory.

Bus subsystem 1090 provides a mechanism to allow the various components and subsystems of computer 902 communicate with each other as intended. Although bus subsystem 1090 is shown schematically as a single bus, alternative embodiments of the bus subsystem may utilize multiple busses or communication paths within the computer 902.

Specific details are given in the following description to provide a thorough understanding of the embodiments. However, it will be understood by one of ordinary skill in the art that the embodiments may be practiced without these specific details. For example, systems, structures, and other components may be shown as components in block-diagram form in order not to obscure the embodiments in unnecessary detail. In other instances, well-known processes, procedures and techniques may be shown without unnecessary detail in order to avoid obscuring the embodiments.

Also, it is noted that individual embodiments may be described as a process which is depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but could have additional steps not included in a figure. Furthermore, embodiments may be implemented by manual techniques, automatic techniques, or any combination thereof.

While the principles of the disclosure have been described above in connection with specific apparatuses and methods, it is to be clearly understood that this description is made only by way of example and not as limitation on the scope of the disclosure.

What is claimed is:

1. A mobile device configured to maintain a location fix while limiting network data traffic, the mobile device comprising:
    a processor;
    a location determining function that can operate using a first location determining method that requires network data access, and can operate using a second location determining method that sometimes requires network data access and sometimes does not;
    a voice channel for wireless communication;
    an input interface for receiving inputs from a user of the mobile device; and
    a memory holding instructions that configure the mobile device to, when the instructions are executed by the processor:
        obtain a location fix using the first location determining method;
        store the location fix in memory;
        repeatedly request additional location fixes using the second location determining method, the repeated requests being separated in time by at least a first predetermined interval;
        store any location fixes received using the second location determining method in the memory; and
        when a predetermined number of requests to determine location using the second location determining method have failed, obtain a new location fix using the first location determining method only if a second predetermined interval has elapsed since the most recent use of the first location determining method.

2. The mobile device of claim 1, wherein the instructions further configure the mobile device to:
    recognize that a user of the mobile device has, using the input interface, initiated a voice call over the voice channel to a receiving party;
    during the call, repeatedly request location fixes using the second location determining method.

3. The mobile device of claim 2, wherein the instructions further configure the mobile device to transmit to the receiving part any location fixes obtained during the call.

4. The mobile device of claim 3, wherein the location fixes are transmitted to the receiving party using a communication channel separate from the voice channel of the voice call.

5. The mobile device of claim 2, wherein the location determination requests performed during the call are separated in time by amounts of time less than the first predetermined interval.

6. The mobile device of claim 2, wherein the location determination requests performed during the call are performed in response to prompts from the receiving party.

7. The mobile device of claim 6, further comprising a communication channel separate from the voice channel, and wherein the prompts from the receiving party are received via the communication channel.

8. The mobile device of claim 7, wherein the prompts from the receiving party are received via short message service (SMS) messages.

9. The mobile device of claim 1, wherein the first predetermined interval is at least 15 minutes.

10. A method of operating a mobile communications device, the method comprising:
    in a first operating state, obtaining a location fix using a location determining function of the mobile device using a first location determining method that requires a network data access;
    transitioning to a second operating state;
    in the second operating state, periodically requesting additional location fixes using the location determining function in a second location determining method that sometimes requires a network data access and sometimes does not;
    recognizing that a user of the mobile device has used in input interface of the mobile device to place a voice call to a private response call center;
    in response to the placement of the call, transitioning to a third operating state that comprises a call connected state; and
    during the call connected state, repeatedly requesting location fixes using the location determining function using the second location determining method and communicating any location fixes obtained during the call connected state to the private response call center; wherein location fixes are requested more frequently in the call connected state than in the second operating state.

11. The method of claim 10, wherein location fixes obtained during the call connected state are communicated to the private response center using short message service (SMS) messages.

12. The method of claim 10, further comprising, in the third operating state:
    recognizing that a request to determine location using the second location determining method has failed; and
    repeating the request specifying a reduced accuracy level as compared with the accuracy level of the failed request.

13. The method of claim 10, further comprising, in the second operating state:
    receiving almanac and ephemeris data in response to a location determination request using the second location determining method; and
    storing the almanac and ephemeris data in a memory of the mobile communications device.

14. The method of claim 10, further comprising:
    storing in a memory each location fix received during the second operating state; and
    upon entry to the call connected state, communicating to the private response call center the most recent location fix stored during the second operating state.

15. A method of operating a mobile communications device, the method comprising:
- in a first operating state, obtaining a location fix using a location determining function of the mobile device using a first location determining method that requires a network data access;
- transitioning to a second operating state;
- in the second operating state, periodically requesting additional location fixes using the location determining function in a second location determining method that sometimes requires a network data access and sometimes does not;
- recognizing that a user of the mobile device has used in input interface of the mobile device to place a voice call to a private response call center;
- in response to the placement of the call, transitioning to a third operating state that comprises a call connected state; and
- during the call connected state, repeatedly requesting location fixes using the location determining function using the second location determining method and communicating any location fixes obtained during the call connected state to the private response call center;
- wherein the method further comprises, in the second operating state:
- recognizing that a predetermined number of the location fix requests using the location determining function in the second location determining method have failed; and
- obtaining a new location fix using the first location determining method.

16. The method of claim 15, wherein the new location fix is obtained only if a predetermined time interval has elapsed since the most recent use of the first location determining method.

* * * * *